US011624720B2

United States Patent
Boenke et al.

(10) Patent No.: US 11,624,720 B2
(45) Date of Patent: Apr. 11, 2023

(54) SALINITY DETECTION DEVICE

(71) Applicant: Pillar, Inc., Wytheville, VA (US)

(72) Inventors: Mark Boenke, Wytheville, VA (US); Robert Davignon, Terre Haute, IN (US); Zhan Chen, Terre Haute, IN (US); Brian Dougherty, Terre Haute, IN (US); Charles E. Brooks, Bland, VA (US)

(73) Assignee: Pillar Inc., Wytheville, VA (US)

( * ) Notice: Subject to any disclaimer, the term of this patent is extended or adjusted under 35 U.S.C. 154(b) by 595 days.

(21) Appl. No.: 16/714,156

(22) Filed: Dec. 13, 2019

(65) Prior Publication Data

US 2020/0225179 A1 Jul. 16, 2020

Related U.S. Application Data

(60) Provisional application No. 62/791,465, filed on Jan. 11, 2019.

(51) Int. Cl.
| | |
|---|---|
| *G01N 27/07* | (2006.01) |
| *B62D 25/18* | (2006.01) |
| *G01N 27/10* | (2006.01) |
| *G01N 1/02* | (2006.01) |

(52) U.S. Cl.
CPC .............. *G01N 27/07* (2013.01); *B62D 25/18* (2013.01); *G01N 1/02* (2013.01); *G01N 27/10* (2013.01); *G01N 2001/028* (2013.01)

(58) Field of Classification Search
CPC .......... E01H 10/007; B62D 25/16–188; G01N 1/02; G01N 2001/028; G01N 27/06–10
See application file for complete search history.

(56) References Cited

U.S. PATENT DOCUMENTS

| | | | | |
|---|---|---|---|---|
| 3,028,546 A | * | 4/1962 | Sproule ................. | G01N 27/07 324/450 |
| 6,535,141 B1 | * | 3/2003 | Doherty .............. | B60R 16/0237 340/580 |
| 7,323,887 B2 | * | 1/2008 | Feng ...................... | C25D 17/02 73/54.01 |
| 7,839,301 B2 | * | 11/2010 | Doherty ................ | E01H 10/007 239/662 |

FOREIGN PATENT DOCUMENTS

| | | | | |
|---|---|---|---|---|
| DE | 102016006200 A1 | * | 11/2017 | ............ B60W 40/06 |
| JP | H1114515 A | | 1/1999 | |
| JP | 2005345175 A | * | 12/2005 | ........... E01H 10/007 |
| JP | 2006130086 A | * | 5/2006 | |
| JP | 2007057286 A | * | 3/2007 | |
| JP | 2007205881 A | * | 8/2007 | |

* cited by examiner

*Primary Examiner* — Justin N Olamit
(74) *Attorney, Agent, or Firm* — Fitch, Even, Tabin & Flannery LLP

(57) ABSTRACT

Disclosed is a salinity detection device. The salinity detection device has a collection plate, a mounting frame, and a sensor portion including a predominantly non-metallic sensor. The device may be mounted in a wheel well of a vehicle via the mounting frame and the collection plate may be attached to the mounting frame and positioned behind a wheel such that water on a road surface may be splashed thereon. The collection plate is fluidically connected to the sensor portion so that water may flow through the sensor portion proximate the sensor to measure a current flowing through the water and determine a salinity thereof.

16 Claims, 17 Drawing Sheets

SALINITY DETECTION DEVICE

CROSS-REFERENCE TO RELATED APPLICATIONS

This application claims the benefit of U.S. Provisional Application No. 62/791,465, filed Jan. 11, 2019, which is incorporated herein by reference in its entirety.

TECHNICAL FIELD

This disclosure relates generally to the field of sensors, and in certain embodiments relates to a device for detecting salinity of a fluid on a road surface using a predominantly non-metallic sensor.

BACKGROUND

During the winter season when the temperature is below freezing, water on road surfaces may freeze over and form ice patches on the road. To prevent such ice formation on road surfaces, various anti-icing chemicals, such as salt, may be dispersed on the road to lower the freezing temperature of the water and thereby inhibit freezing.

After the water on the road surface reaches a certain threshold salinity content, further salting of the road will have a diminishing effect. At this point, additional salting is no longer required and further distribution of salt results in additional costs and potential damage to the surface of the road. Various sensors have been proposed to determine the salinity of water on a road surface to determine if further salting is required. However, continuous use of a metal sensor in winter conditions to measure the salinity by way of conductivity of water may cause the sensor to corrode and degrade such that replacement is routinely required.

Generally, it has now been found that road salinity may be measured by placing a conductive sensor made of a predominantly non-metallic material into the wheel well of a vehicle.

DETAILED DESCRIPTION

In general, a salinity detection device having a collection plate, a mounting frame, and a sensor portion including a predominantly non-metallic sensor is provided. The salinity detection device may be mounted in a wheel well of a vehicle via the mounting frame. The collection plate is attached to the mounting frame and positioned in the wheel well such that water located on a road surface may be caused to impinge thereon via movement of a vehicle wheel. The collection plate is fluidically connected to the sensor portion so the water impinging thereon is introduced to the sensor portion and proximate the predominantly non-metallic sensor to measure a current flowing through the water. From this current measurement a proportional salinity (i.e., salt concentration) of the road water may be determined.

Figure 17:
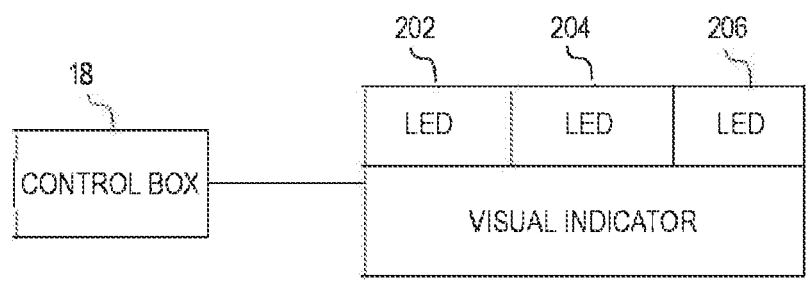
FIG. 17 is a representation of a visual indicator of the salinity detection device of FIG. 1.

As depicted in FIGS. 1-18, a salinity detection device 10 including a collection plate 12, a sensor portion 14 and a mounting frame 16 is provided. The salinity detection device 10 may additionally include a controller or control box 18 (shown in FIGS. 15, 17) for supplying power to, and measuring an electrical current of, the sensor portion 14. The salinity detection device 10 may be mounted via the mounting frame 16 to a vehicle, preferably in a wheel well thereof. When a vehicle containing the salinity detection device 10 drives over a surface containing a fluid such as water, the rotation of the wheels may cause the fluid to splash or spray upwards and opposite the direction of travel into the wheel well. By mounting the collection plate 12 as described hereinafter, the spraying water may be collected and funneled to the sensor portion 14 including a carbon-based sensor 11, and an electrical current through the water may be measured to determine a salinity of the water. So configured, the salinity detection device 10 may continuously measure the salinity of water at a plurality of different intervals while a vehicle including the salinity detection device 10 is in motion.

Figure 1:
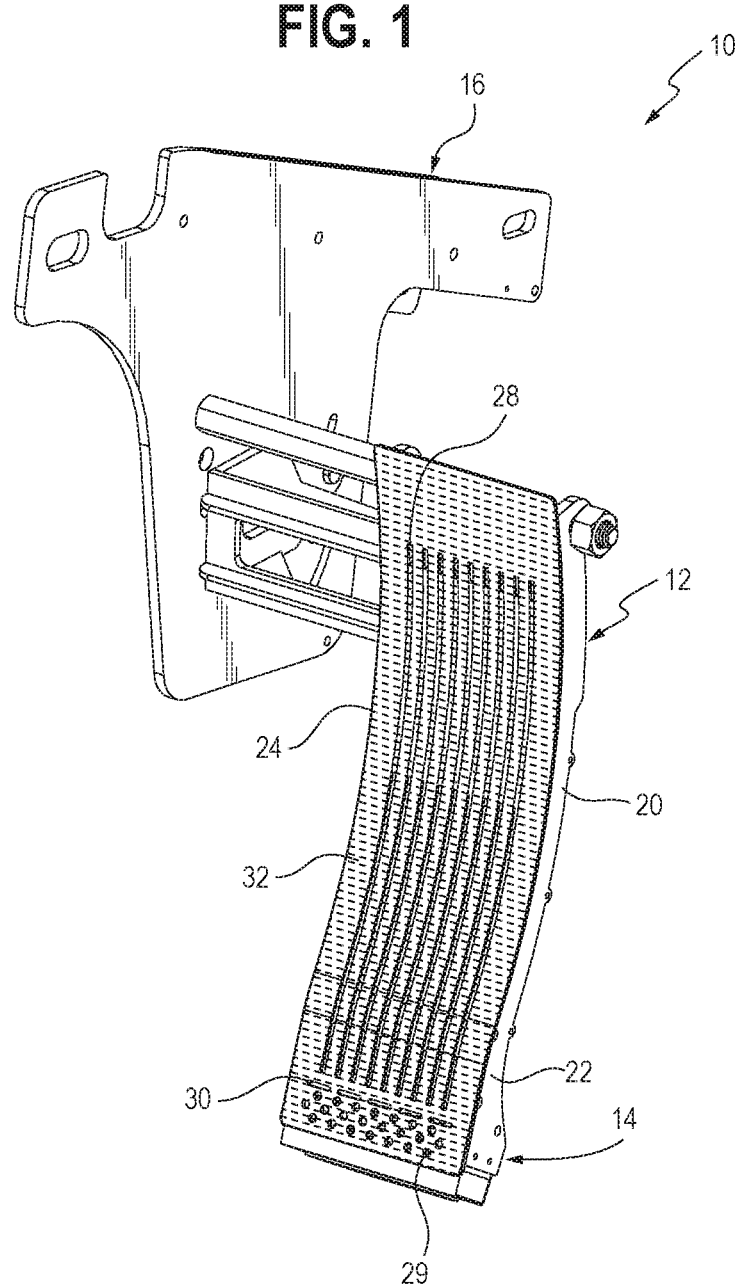
FIG. 1 is a front perspective view of a salinity detection device in accordance with one embodiment.
Figure 2:
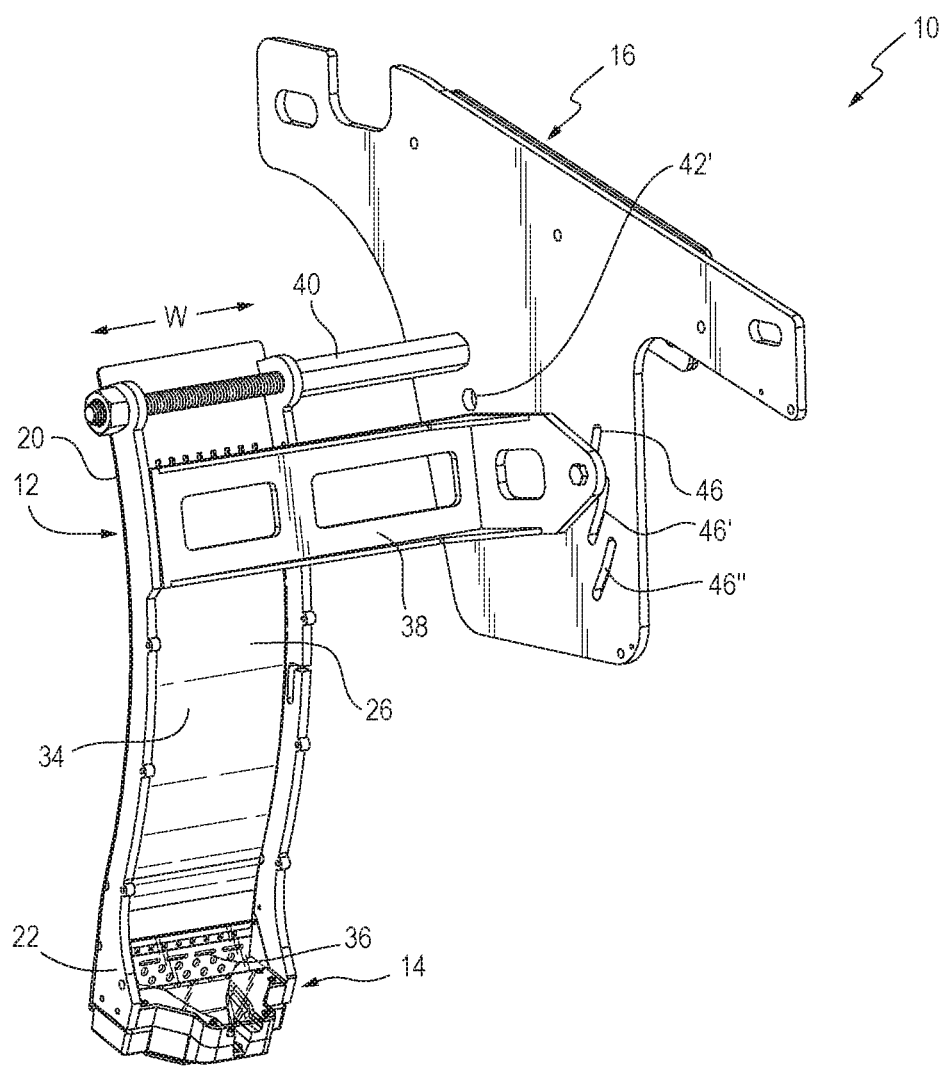
FIG. 2 is a rear perspective view of the salinity detection device of FIG. 1 showing a heating member and a sensor portion.

The collection plate 12 includes a superior portion 20 and an inferior portion 22. The superior portion 20 has a generally arcuate configuration to correspond with, and accommodate, the shape of a car wheel. The inferior portion 22 may have a flat or linear configuration such that the inferior portion 22 is vertically oriented with respect to the vehicle to which it is mounted, and in other embodiments, may have an arcuate shape (not shown) similar to the superior portion 20. The sensor portion 14 is preferably disposed adjacent the inferior portion 22 as shown in FIG. 2. The collection plate 12 preferably has a width W (FIG. 6) that may be sized to correspond with a width of a tire tread for a tire typical of the vehicle into which the device is intended to be mounted. The width W is not critical so long as the device is sized sufficiently to receive sufficient road water to function accurately. The width W may vary depending on the size of the wheel or wheel well of the vehicle to which the collection plate 12 is mounted.

Figure 3:
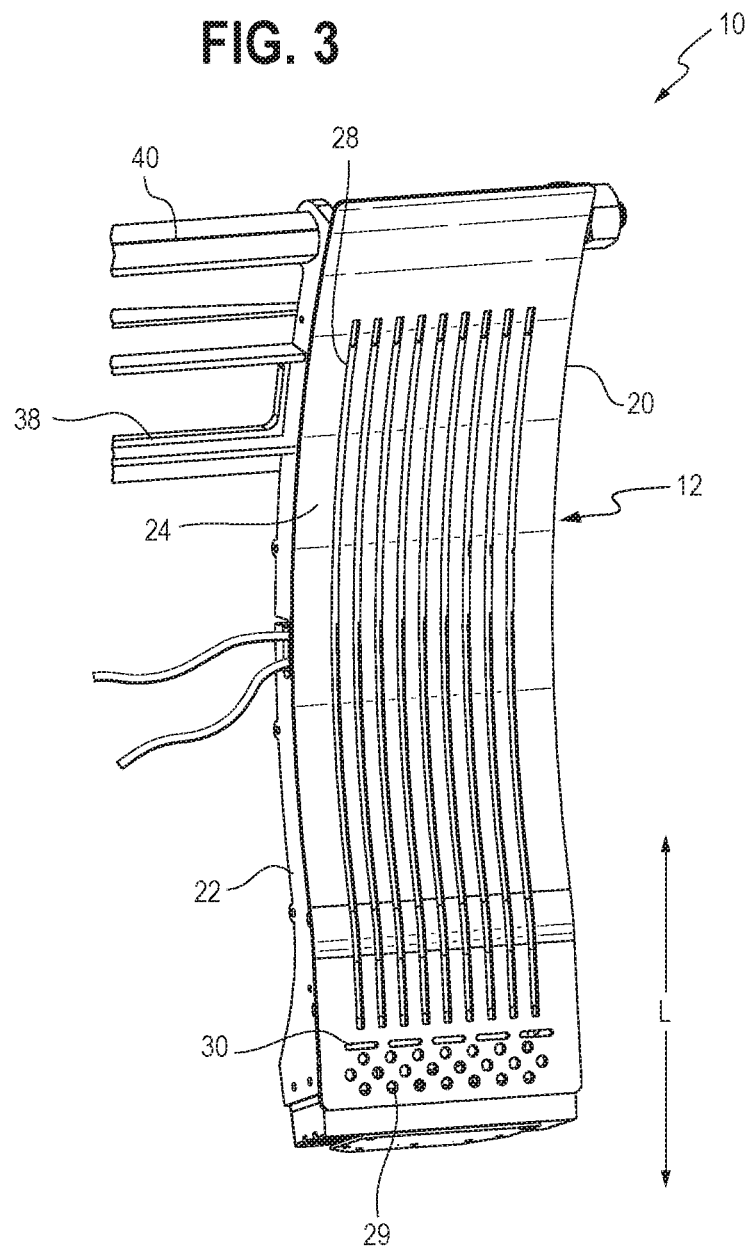
FIG. 3 is a perspective view of a proximal side of the salinity detection device of FIG. 1 showing a filtering screen covering a collection plate.
Figure 4:
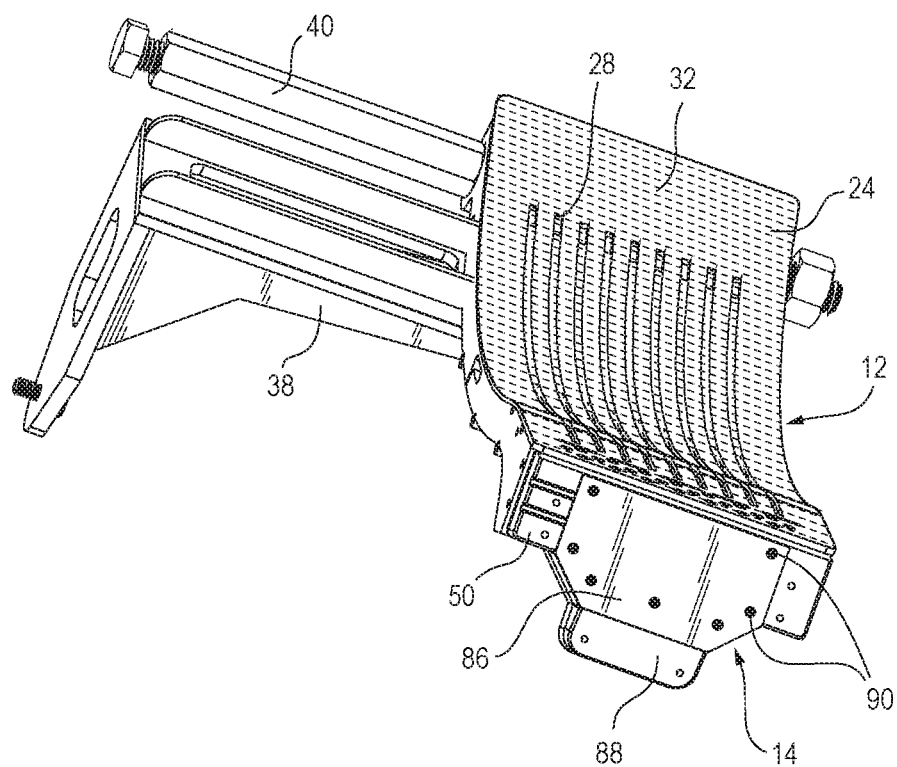
FIG. 4 is a perspective view from below the salinity detection device of FIG. 1 showing a bottom surface of the sensor portion.
Figure 6:
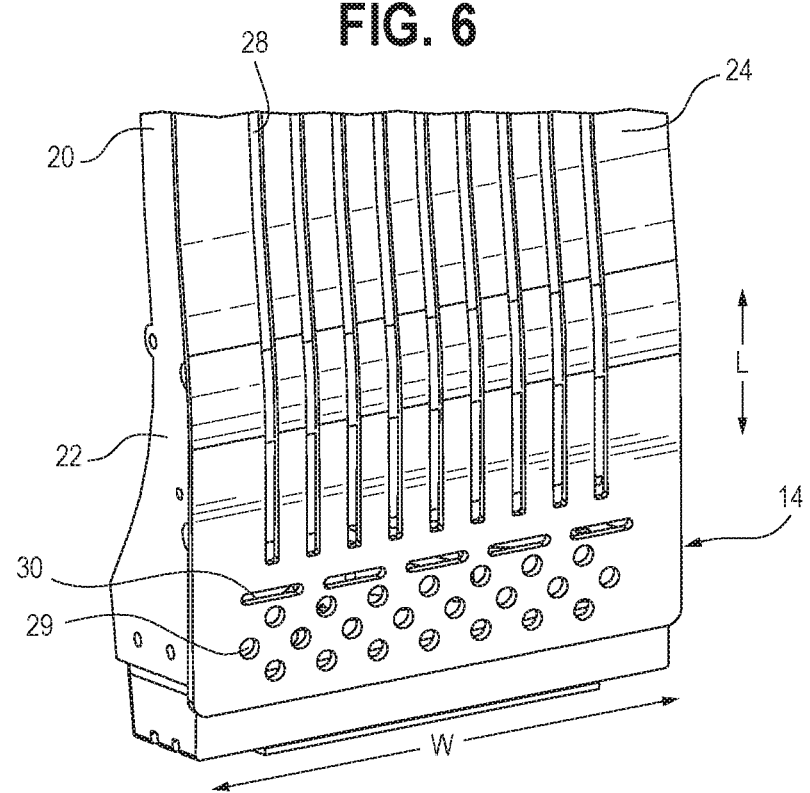
FIG. 6 is a perspective view of an inferior portion of the collection plate of the salinity detection device of FIG. 1 showing slots and other apertures therein.

The collection plate 12 has a proximal side 24 located nearer a wheel when positioned in the wheel well of a vehicle and a distal side 26 opposite the proximal side 24. The proximal side 24 of the collection plate 12 includes one or more openings such as slots 28 extending along a longitudinal axis L along the superior and inferior portions 20, 22. The slots 28 enable the fluidic connection of the sensor portion 14 to the proximal side 24 of the collection plate 12 and are configured to facilitate the flow of water therethrough. As shown in FIGS. 3 and 6, a plurality of slots 28 are positioned on the proximal side 24 of the collection plate 12 such that water splashing from a wheel contacting the road surface will impinge on the collection plate 12 and flow down the slot 28 in the longitudinal direction L from the superior portion 20 to the inferior portion 22. Additionally, or alternatively, the proximal side 24 may include one or more laterally extending slots 30 and one or more apertures 29 preferably proximate the inferior portion 22, that is fluidically connected to the sensor portion 14 such that water may flow therethrough and enter the sensor portion 14. The slots and apertures 28, 29, 30 may be formed in any suitable shape to permit the flow of water from the proximal side 24 of the collection plate 12 into the sensor portion 14 such that the salinity of the water may be measured.

In the illustrated and preferable embodiment, a filtering screen or mesh 32 is provided to cover the proximal side 24 of the collection plate 12 to inhibit debris, such as sand or rock from the road surface, from entering into or blocking the slots and apertures 28, 29, 30 thus preventing effective fluid flow therethrough. The filtering screen or mesh 32 is preferably of a metal material such as aluminum or stainless steel, and may have a mesh size of, for example, 325 to inhibit debris from blocking fluid flow as described above. The material used to form the filtering screen or mesh 32 is not critical, and in other embodiments, the screen 32 may be formed of other materials such as fiberglass.

Figure 5:
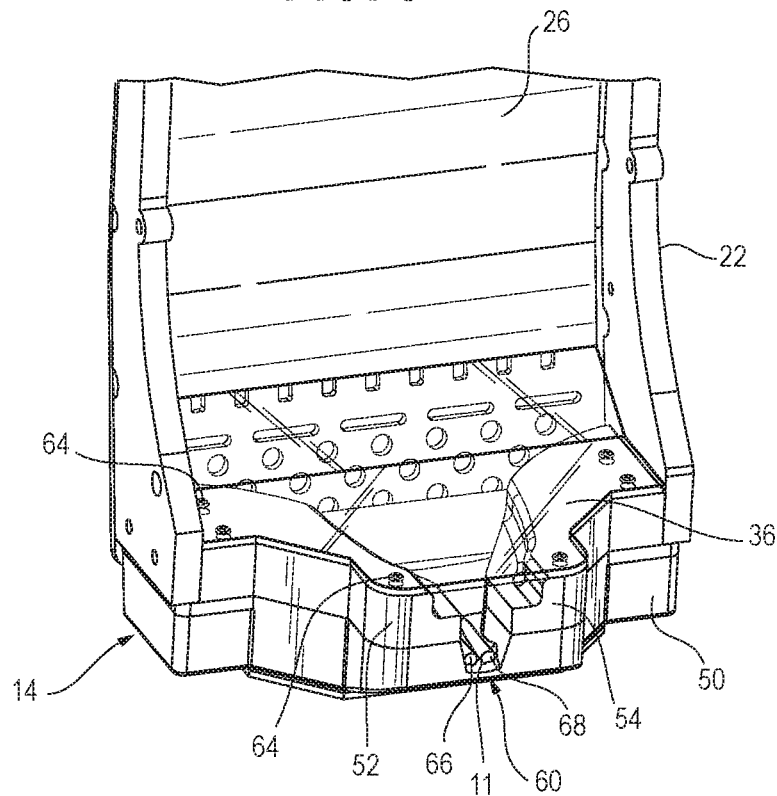
FIG. 5 is a relatively enlarged perspective view of the distal side of the salinity detection device of FIG. 1 showing the heating member and the sensor portion.

As shown in FIGS. 2 and 5, a heating member 34 is disposed on the distal side 26 of the collection plate 12, and may be attached thereto using conventional techniques. The heating member 34 provides heat to the collection plate 12 and the filtering screen 32 to prevent slush, ice, and snow from remaining thereon and potentially clogging the filtering screen 32. The heating member 34 may be electrically connected to, and powered by, an electrical power supply 92 of the control box 18 (FIG. 15) or may be powered by a battery of the vehicle. The heating member 34 may be electrically coupled to a thermistor 93 (FIG. 15) and associated circuitry for depowering the heating member 34 if the temperature exceeds a predetermined temperature threshold. So configured, the heating member 34 inhibits ice from forming on the salinity detection device 10 which would otherwise inhibit effective operation thereof.

FIG. 5 shows the sensor portion 14 attached to the distal side 26 of the inferior portion 22 of the collection plate 12. The laterally extending slots 30 connect between the proximal side 24 of the collection plate 12 and the distal side 26 of the collection plate 12 to facilitate water flow into the sensor portion 14. A cover portion 36 may be attached to prevent water from inadvertently splashing out of the sensor portion 14 before a current of the water may be measured by the carbon sensor 11, as described in more detail hereinafter. The heating member 34 may be positioned adjacent to the laterally extending slots 30 and the apertures 29 to prevent ice from forming therein and blocking fluid flow therethrough. The laterally extending slots 30 and apertures 29 are also shown from the proximal side 24 of the collection plate 12 in FIG. 6.

Figure 7A:
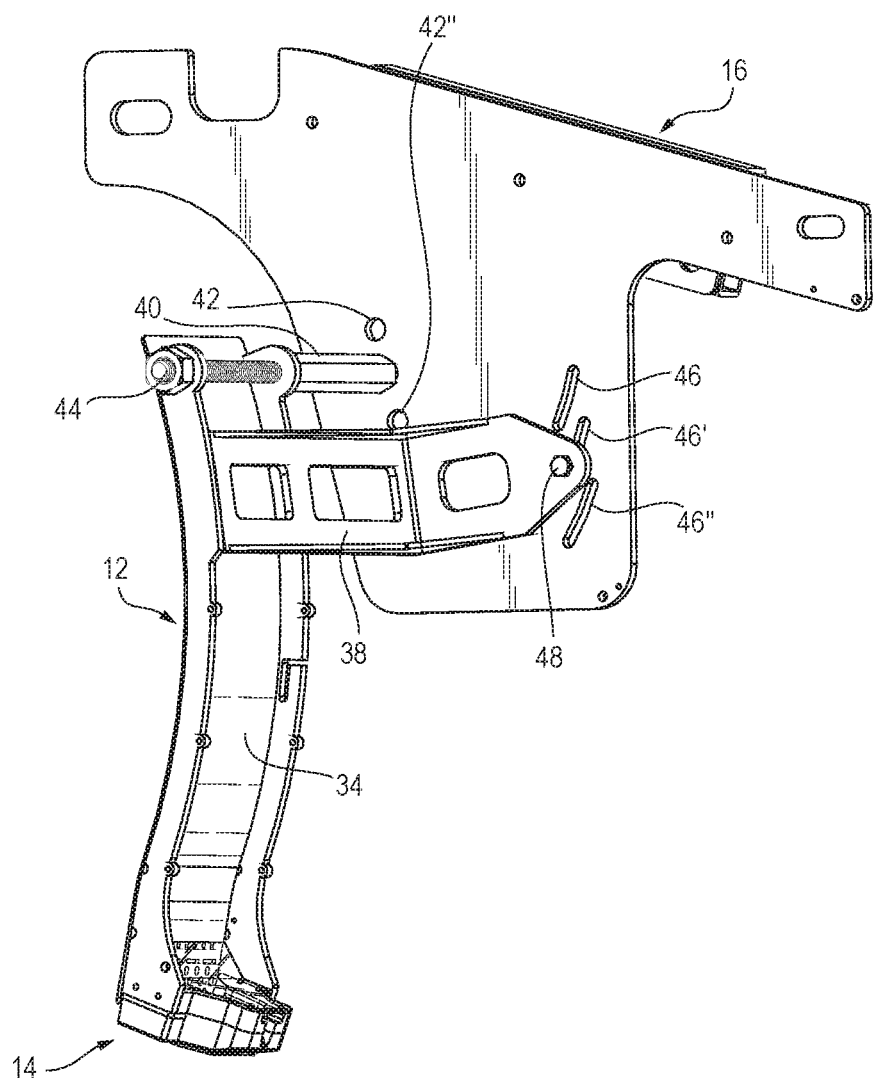
FIG. 7A is a perspective view of a first side of the mounting frame of the salinity detection device of FIG. 1.
Figure 7B:
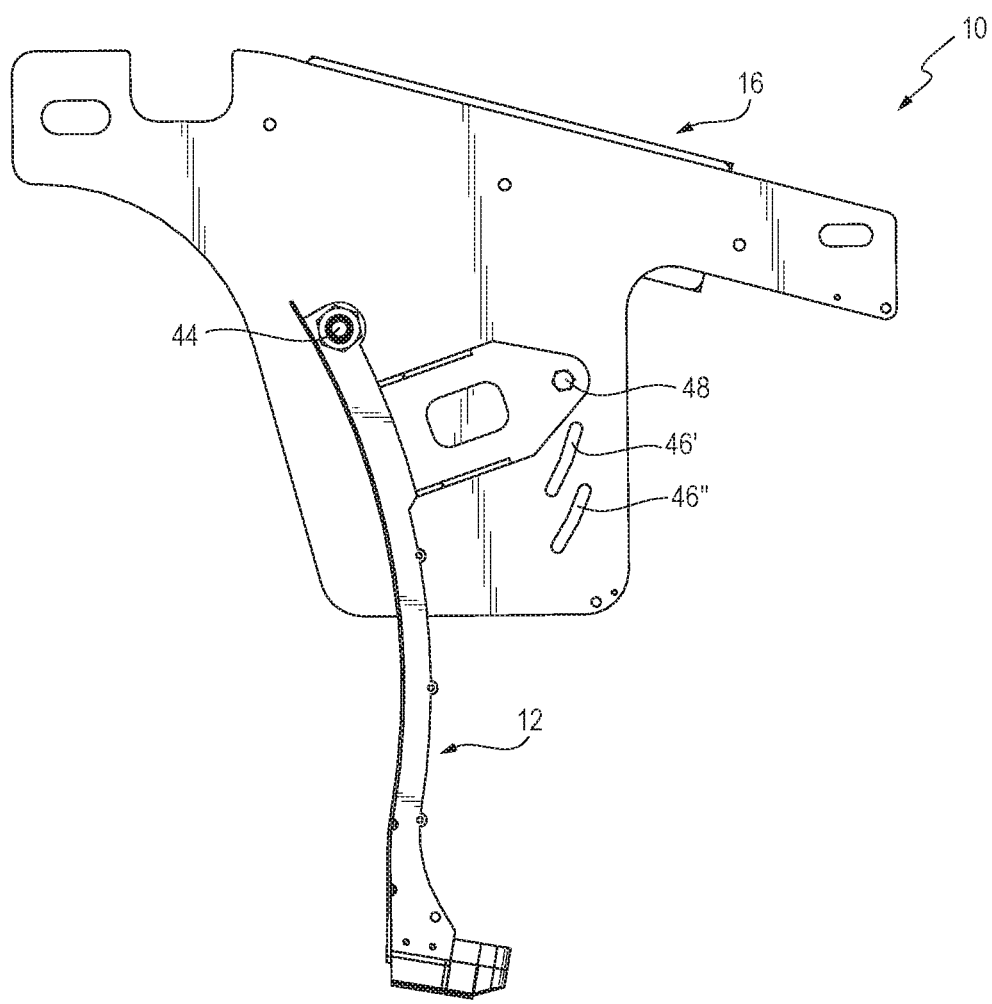
FIG. 7B is a side elevational view of the first side of the mounting frame showing the salinity detection device in a first position.
Figure 7C:
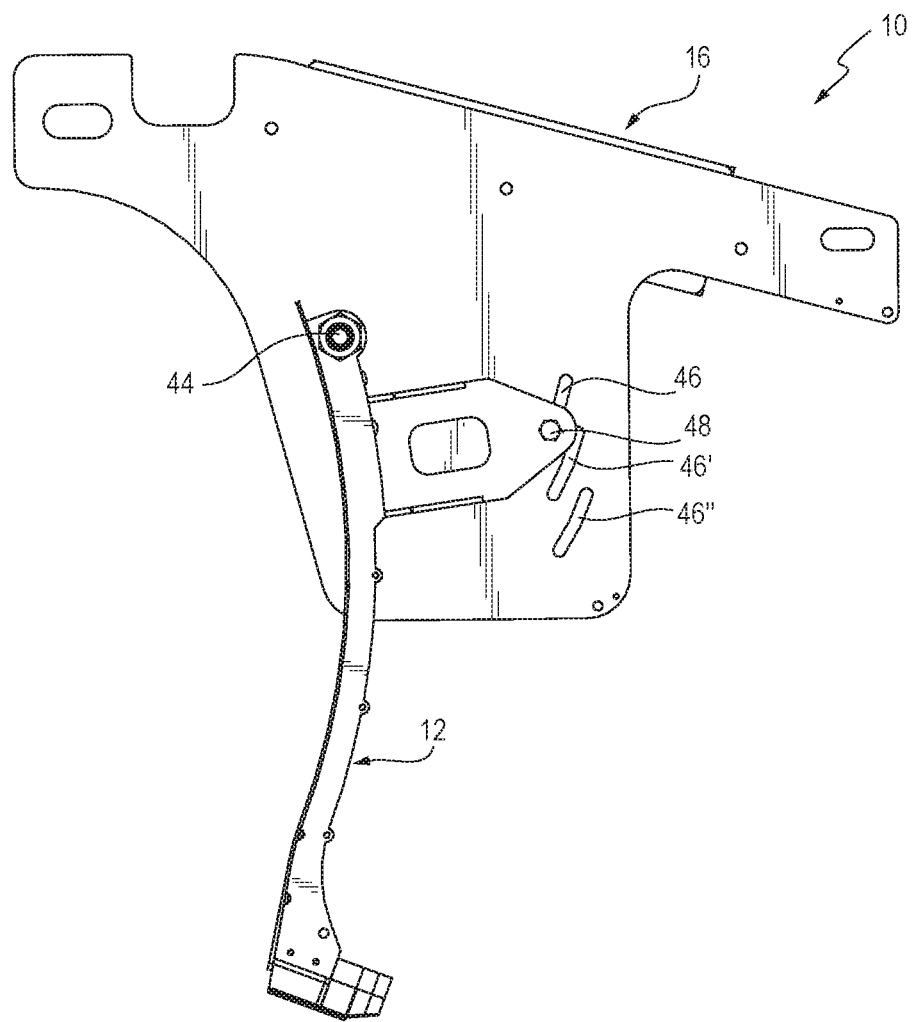
FIG. 7C is a side elevational view of the first side of the mounting frame showing the salinity detection device in a second position.
Figure 8:
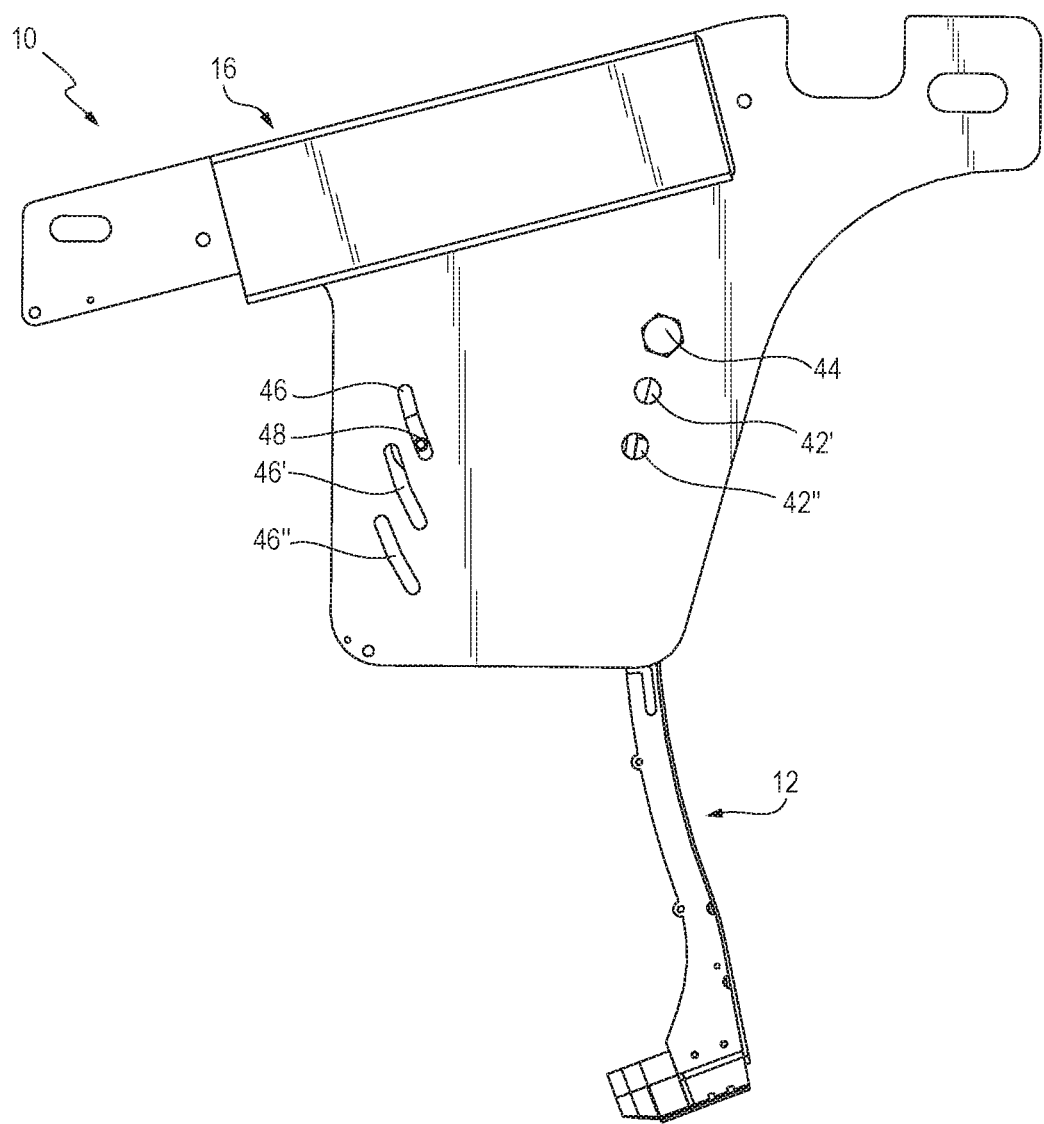
FIG. 8 is a side elevational view of a second side of the mounting frame shown in FIG. 7C with the salinity detection device in the second adjusted position.
Figure 9:
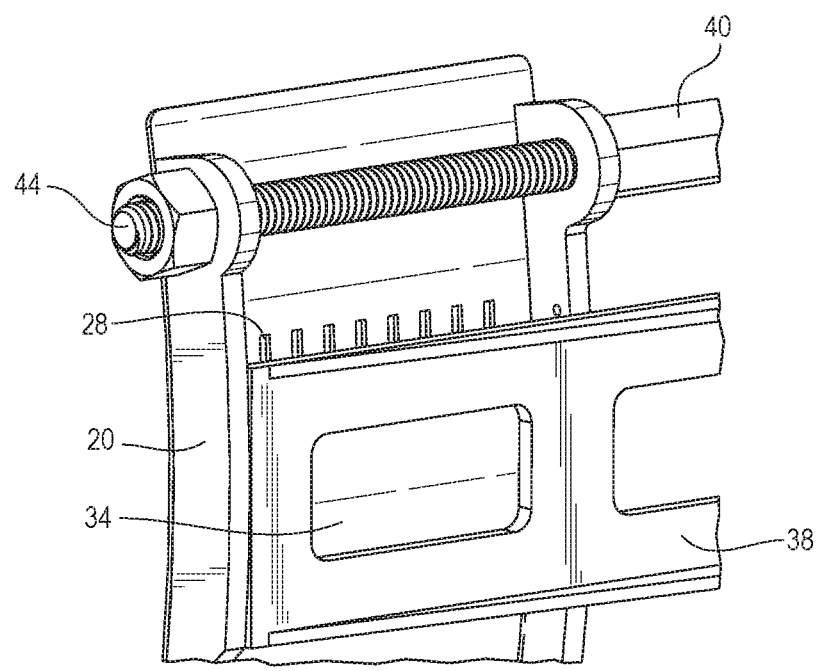
FIG. 9 is a relatively enlarged perspective view of the distal side of the collection plate of the salinity detection device of FIG. 1.
Figure 10:
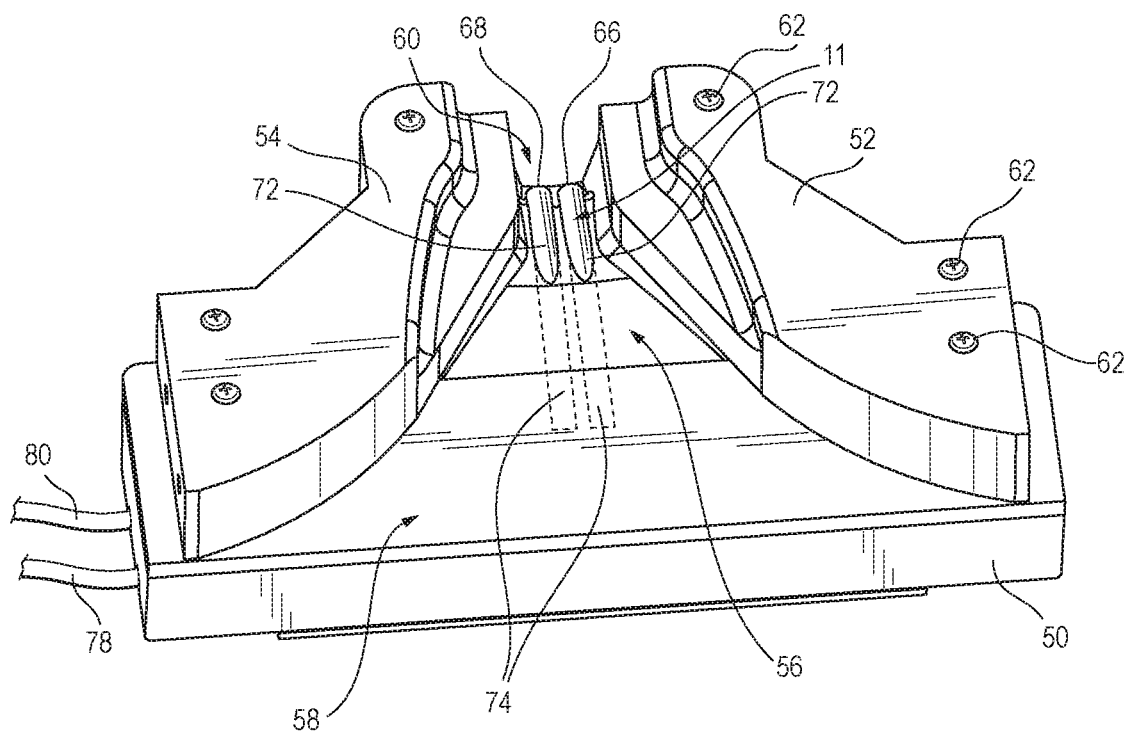
FIG. 10 is a rear perspective view of the sensor portion of the collection plate of the salinity detection device of FIG. 1.

With reference to FIGS. 7A-7C and 8, the mounting frame 16 may include an arm member 38 and a support member 40. The mounting frame 16 may include one or more openings 42, 42', 42" configured to receive a fastener, such as a bolt 44 for attaching the support member 40 to the mounting frame 16. The mounting frame 16 may additionally include one or more arcuate slots 46, 46', 46" configured to receive a fastener, such as a bolt 48 for attaching the arm member 38 to the mounting frame 16, the slots 46, 46', 46" and openings 42, 42', 42" permitting adjustment of the position and angle of the collection plate 12 as shown in, for example, FIGS. 7A-7C. The slot 46 may have a length providing for sliding adjustment of the arm member 40 in the slot 46. The arm and support members 38, 40 may then be attached to the collection plate 12 via the bolts 44, 48 respectively. In the illustrated embodiment, the arm member 38 and support member 40 are adjustable such that the position of the collection plate 12 within the wheel well may be adjusted by attaching the arm and support members 38, 40 via bolts 44, 48 to different auxiliary openings 42', 42" and slots 46', 46" of the mounting frame 16. For example, the support member 40 may be attached via bolt 48 through opening 42' and the arm member 28 may be attached via bolt through slot 46' to adjust and position the collection plate 12 in a different position. As shown in FIGS. 7B, 7C, and 9, the support member 40 may be rotatably attached to the arm member 38 such that the arm member 38 may be slid and lockingly inserted into different positions along any of slots 46, 46', 46" to adjust the angle at which the collection plate 12 is placed in the wheel well. So configured, the collection plate 12 may be moved to a position in which water collection may be optimized.

Generally, the shape of the mounting frame 16 may be adjusted depending on the type of vehicle that the salinity detection device 10 is mounted to. For example, different types of vehicles may have different structural frames such that a mounting frame 16 shaped for mounting to one type of vehicle may not be mountable to a different type of vehicle. The mounting frame 16 provided may be formed in different configurations to be mounted in various different types of pick-up trucks, plows, or other dump-style trucks so that any type of vehicle may be equipped with the salinity detection device 10 as provided herein.

As described above, and shown in FIG. 5, the sensor portion 14 is preferably disposed adjacent the distal side 26 of the inferior portion 22 of the collection plate 12 and fluidically connected thereto such that water flows through the slots and apertures 28, 29, 30 of the proximal side 24 of the collection plate 12 into the sensor portion 14. The sensor portion 14 may be formed of multiple, separate components, or may be of a unitary one-piece construction. FIGS. 10-14 show the sensor portion 14 removed from the inferior portion 22. As illustrated, the sensor portion 14 includes a base portion 50, and first and second channel walls 52, 54 defining a generally U-shaped channel portion 56, the U-shaped channel portion having an inlet 58 and an outlet 60. The shape of the channel portion 56 may be formed in other configurations that permit sufficient flow of water over the sensor 11 for salinity detection. For example, the thickness of the channel walls 52, 54 may be increased or decreased, or the shape of the outlet 60 may be altered, among other variations. In embodiments where the base portion 50 and the first and second channel walls 52, 54 are formed as separate components, the first and second channel walls 52, 54 may be affixed to the base portion by, for example, screws 62.

During operation of the salinity detection device 10, the channel portion 56 is covered by the cover portion 36 as shown in FIG. 5 to promote flow of the water over the carbon sensor 11. The cover portion 36 may be attached to the sensor portion by, for example, screws 64.

Figure 11:
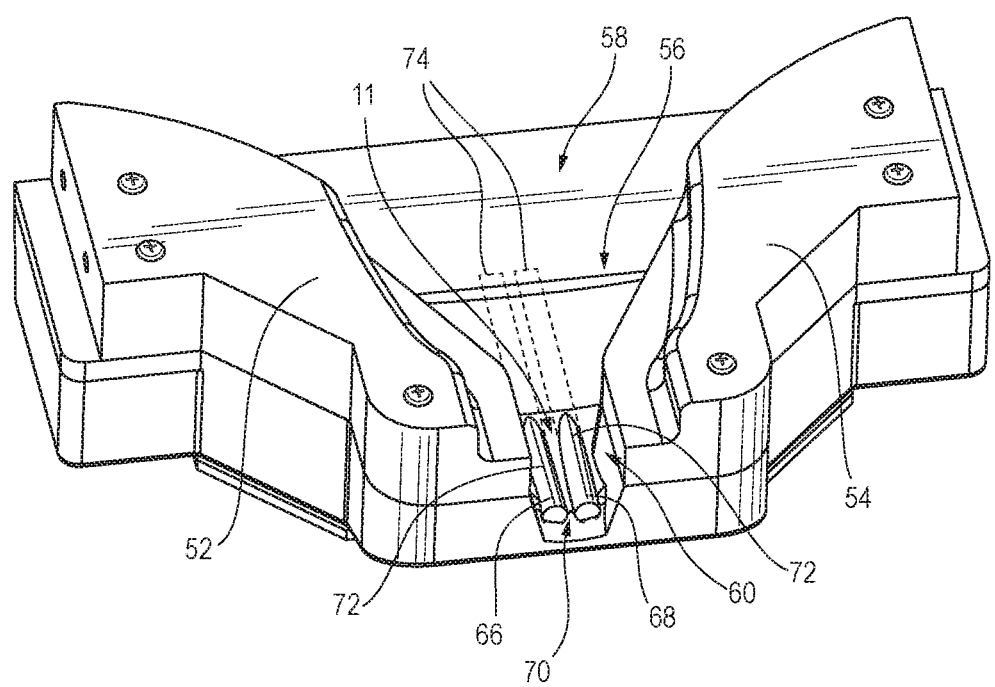
FIG. 11 is a front perspective view of the sensor portion of FIG. 10 showing a sensor having first and second nodes.
Figure 12:
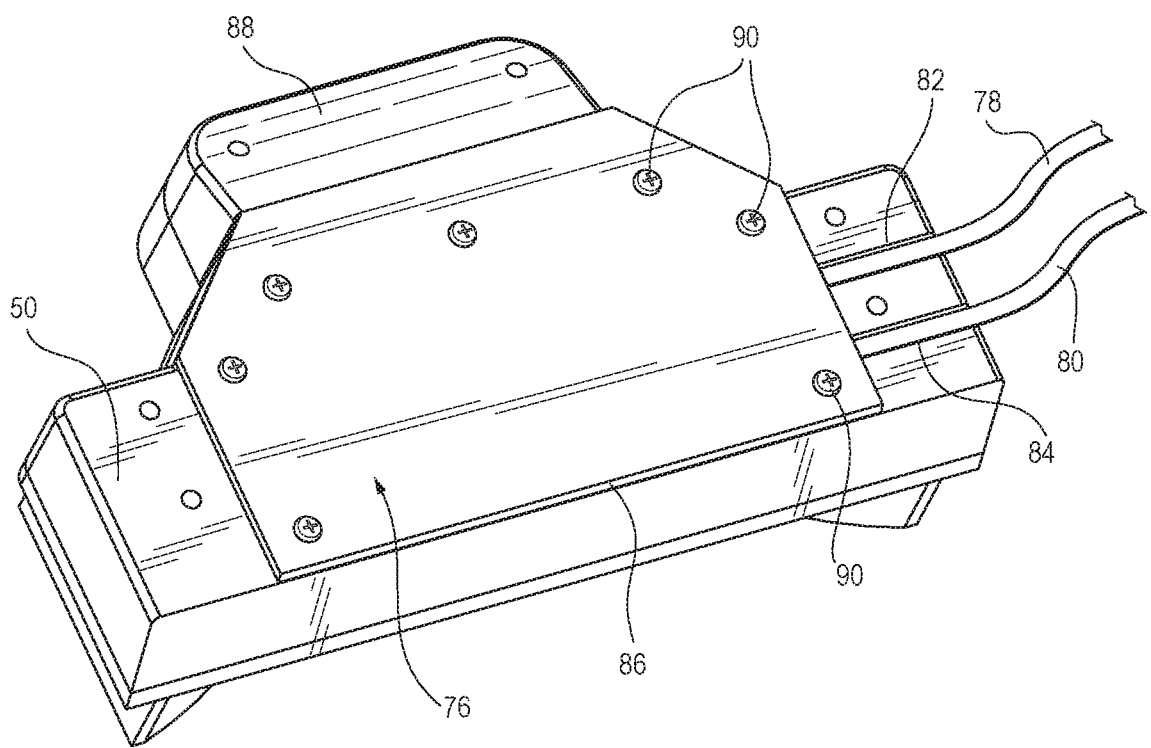
FIG. 12 a perspective view of the bottom surface of the sensor portion of FIG. 10.
Figure 13:
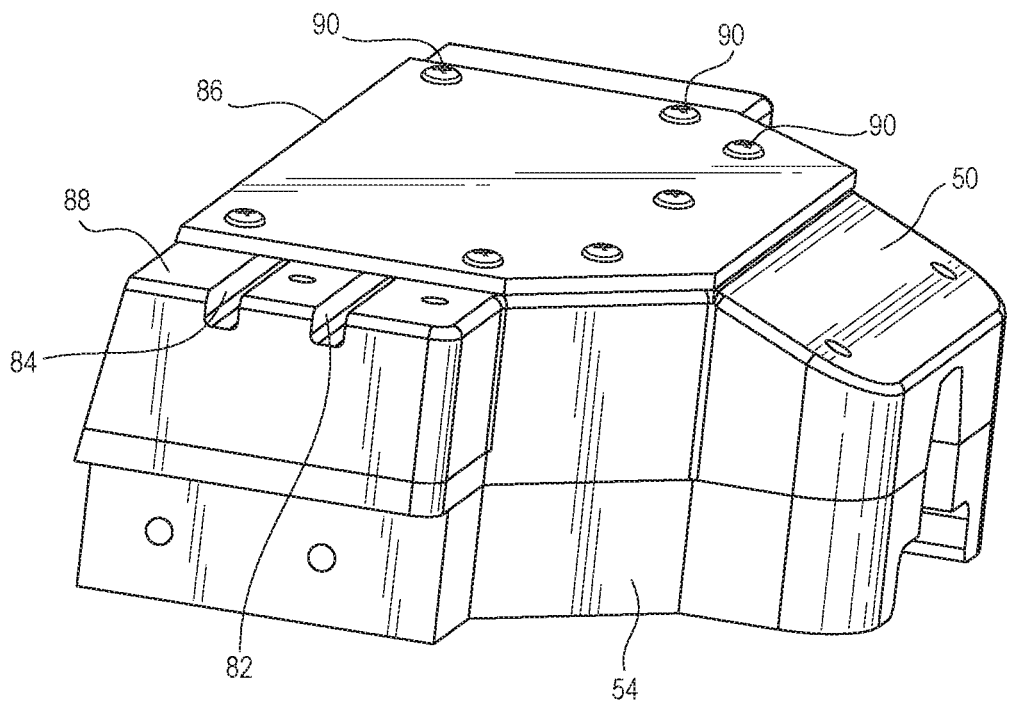
FIG. 13 is a perspective view of a first side of the sensor portion of FIG. 10.
Figure 14:
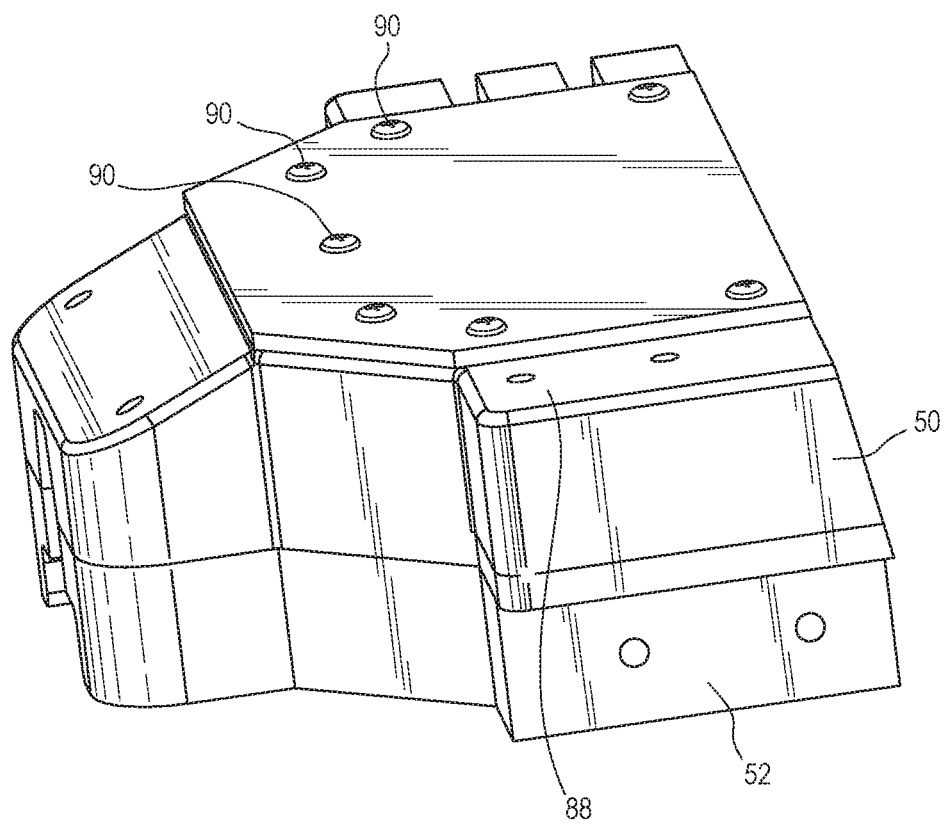
FIG. 14 is a perspective view of a second side of the sensor portion of FIG. 10.

The inlet 58 is fluidically connected to the proximal side 24 of the inferior portion 22 of the collection plate 12 such that water or fluid may flow therethrough (e.g., via the slots and apertures 28, 29, 30). As shown in FIG. 11, the outlet 60 is disposed at the bottom of the generally U-shaped channel portion 56 to funnel water out of the sensor portion 14. The carbon-based sensor 11 is disposed near the outlet 60. In the illustrated and preferable embodiment of FIG. 11, the carbon sensor 11 includes a first carbon node 66 and a second carbon node 68 with a spaced interval 70 therebetween (shown in FIG. 11). Each of the first and second nodes 66, 68 includes a first, exposed portion 72 and a second portion 74. In some embodiments, the second portion 74 may be covered in an electrically conductive material such as copper. The first and second carbon nodes 66, 68 are partially exposed such that water or fluid in the sensor portion may flow therebetween. Preferably, the first and second carbon nodes 66, 68 are made of graphite or carbon fiber, but they alternatively may be made of any electrically conductive material that is predominately non-metallic, such as a conductive polymer.

The spaced interval 70 between the first and second nodes 66, 68 through which the water flows between is preferably between about 0.1 mm to about 3.0 mm, and the first, exposed portion 72 of the first and second nodes 66, 68 is about 17 mm. The diameter of each of the carbon nodes 66, 68 is about 1 mm.

To form the base portion 50 of the sensor portion 14, the base portion may include an open cavity 76 therein where the carbon sensor 11 may be disposed. Once disposed in the cavity 76, each of the second portions 74 of the first and second carbon nodes 66, 68 may be electrically connected to wires 78, 80, the wires 78, 80 placed in grooves 82, 84 respectively. A sealing cover 86 may be placed on a bottom surface 88 of the base portion 50 to cover the cavity 76 and may be attached using, for example, a plurality of screws 90. Liquid resin or plastic may then be injected into the cavity 76 and allowed to solidify thus enrobing the second portions 74 of the first and second nodes 66, 68 in resin and providing the first, exposed portions 72 near the outlet 60. Some or all portions of the device may be formed by additive printing techniques or by other suitable methods. As described above, the control box 18 may be connected to the carbon sensor 11 via wires, connectors, or the like, such as wires 78, 80.

Figure 15:
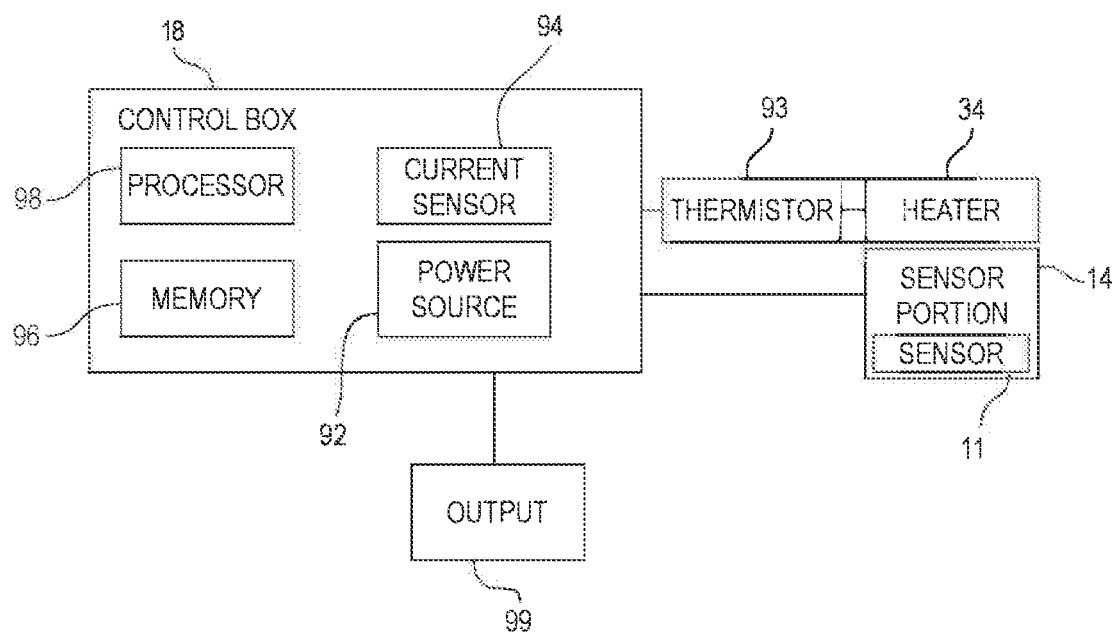
FIG. 15 is a schematic diagram of circuitry useful with the salinity detection device of FIG. 1.
Figure 16:
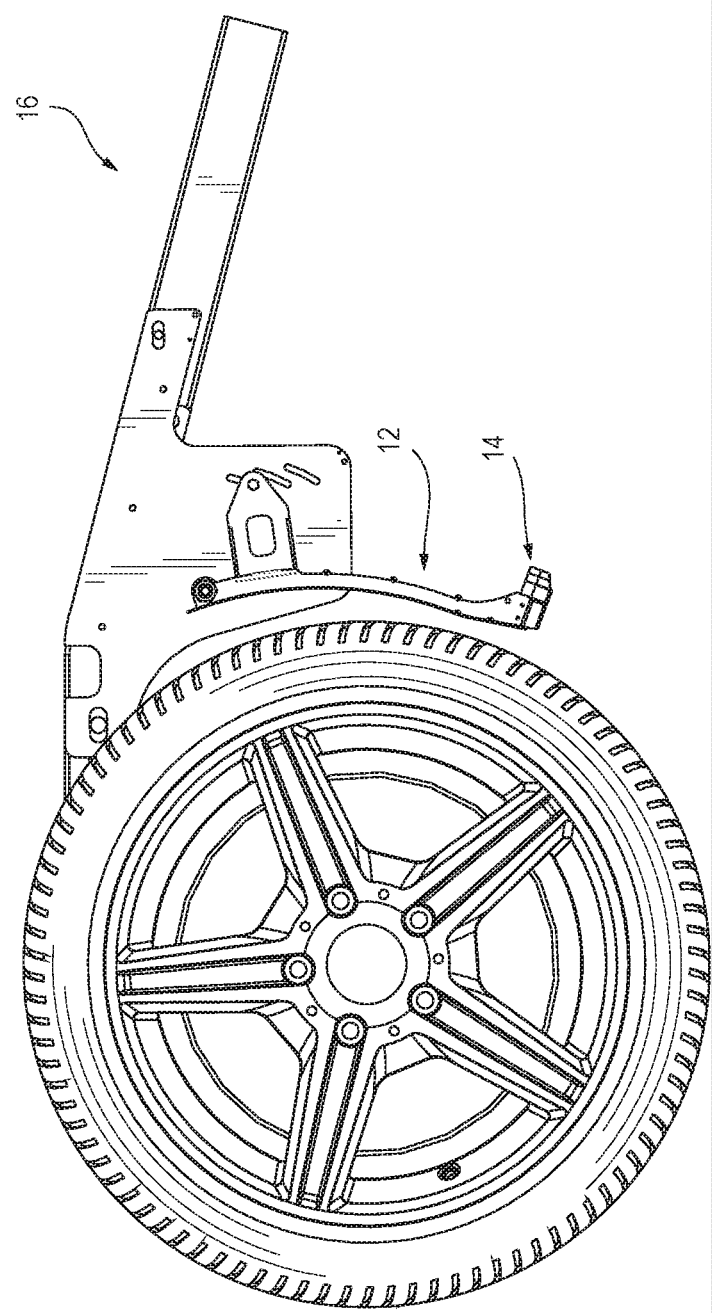
FIG. 16 is a left-side elevational view of a wheel well including the salinity detection device of FIG. 1.

As illustrated in FIG. 15, the control box 18 further includes a power source 92. In embodiments where the collection plate 12 includes the heating member 34, the power source 92 may be a conventional 9-volt battery to supply power to the heating member 34. As illustrated and as described above, the thermistor 93 may be included to assist in determining the temperature of the heating member 34. In a preferable embodiment, the power source 92 is the battery of the vehicle to which the salinity detection device 10 is mounted.

To determine the salinity of water on the road surface, the control box 18 further includes a current sensor 94, such as an ammeter. The power source 92 of the control box 18 provides a current to the carbon sensor 11, and the current sensor 94 may measure a received current from the carbon sensor 11 (circuit shown in FIG. 18). For example the first carbon node 66 may be electrically connected to the power source 92 of the control box 18 via wire 78 and the second carbon node 68 may be electrically connected to the current sensor 94 of the control box 18 via wire 80. Electrically conductive fluid, such as water, located between the first and second carbon nodes 66, 68 may function to close an electrical circuit between the first and second carbon nodes 66, 68 and the current flowing through the water may be measured via the current sensor 94 of the control box 18. The magnitude of the measured current is proportional to the salinity of the water in the sensor portion 14, and the salinity may thus be calculated therefrom.

Referring again to FIG. 15, the control box 18 may additionally include a memory 96 configured to store one or more salinity thresholds and a processor 98 configured to compare the measured salinity with the stored thresholds in the memory 96. If the measured salinity is below a predetermined threshold, an output 99 such as a visual indicator may be used to provide an alert. For example, the output 99 may comprise a single LED that may illuminate only when the processor 98 determines that the measured salinity of the water is either below or above a threshold stored in the memory 96. In other embodiments, such as in FIG. 17, a visual indicator 200 may include multiple LEDS for providing alerts. By way of example, visual indicator 200 may include a green LED 202, a yellow LED 204, and a red LED 206. Each of the LEDs 202, 204, 206 may correspond with a salinity threshold stored in the memory 96 such that each like will illuminate if the processor 98 determines that the measured salinity is above or below one of the predetermined thresholds. In some embodiments, the thresholds may be the same and in other embodiments the thresholds may be selected to be different.

For example, illumination of the green LED 202 may indicate that the measured salinity of the water from the road surface is above a threshold corresponding with safe conditions where no more salt or anti-icing chemicals are needed. Alternatively, illumination of the yellow LED 204 may indicate that the measured salinity of the water from the road surface is below the threshold to illuminate the green LED 202, but above the threshold to illuminate the red LED 206, to indicate to a user that the salinity of the water should be carefully observed. Illumination of the red LED 206 may indicate that the measured salinity of the water is below a critical threshold, and that further salting of the road surface is needed to prevent freezing. In some embodiments, the current reading may be displayed via an analog or digital display, and the human operator of the device may be provided with a table or other information to correlate the measured current to the road water salinity.

Figure 18:
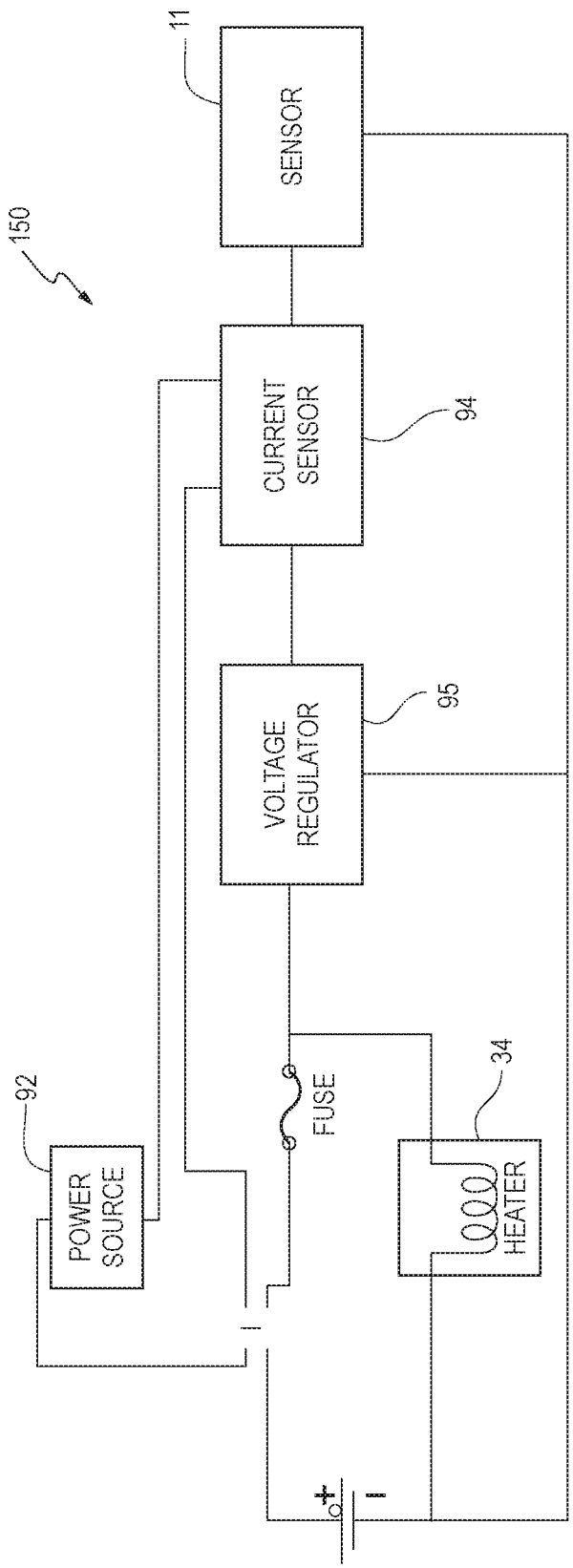
FIG. 18 is a schematic diagram of a circuit useful with a salinity detection device in another embodiment.

With reference to the exemplary circuit 150 shown in FIG. 18, the circuit may include the power source 92, the current sensor 94, the sensor 11, the heater 34, and an optional voltage regulator 95.

A method for detecting salinity is also provided. A vehicle in which that the salinity detection device 10 has been mounted, is over a wet road surface. The water from the road surface may spray off of a wheel of the vehicle and contact the collection plate 12, and the water may enter the sensor portion 14. Thereafter, the method includes measuring the current flow through the sensor portion 14, which may be performed via the current sensor 94., The salinity of the water may be determined based at least in part on the measured current flow. A visual indicator then may display an indication or measurement representative of the determined salinity. A processor of the controller or control box may then compare the determined salinity to a threshold as described above. The controller may be operably coupled to the salt dispensing apparatus of the vehicle and may automatically cause the vehicle to apply salt to the road surface if the determined salinity is below the threshold. Alternatively, an operator of the vehicle may be notified via the visual indicator that the salinity is below the threshold and may manually cause application of salt to the road surface. The salinity detection device may be mounted to a vehicle that does not itself include a salt dispensing apparatus, but which is intended to cooperate with other roadway safety vehicles. In some embodiments, the invention encompasses a vehicle equipped with a salinity sensing device as described herein.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A salinity detection device comprising:
   a vehicle wheel well mounting frame;
   a collection plate connected to the mounting frame, the collection plate having a curved superior portion for placement behind a vehicle wheel, the collection plate further having a proximal side, the proximal side comprising a plate with a plurality of fluid-permissive openings, a distal side and an inferior portion;
   a sensor portion disposed at the inferior portion on the distal side of the collection plate and fluidically communicating with the proximal side of the collection plate for measurement of a salt concentration in a fluid entering an opening in the proximal side;
   said sensor portion having a sensor, an inlet, a channel portion, and an outlet, the channel portion disposed between the inlet and the outlet, and the sensor having exposed first and second nodes proximal the outlet and spaced at an interval, said nodes being comprised of a conductive material that is predominantly non-metallic and said sensor portion permitting continuous fluid flow through said sensor portion while measuring salt concentration; and
   a current sensor electrically coupled to the first and second nodes and configured to measure current flow through fluid flowing through said sensor portion when power is applied to one of said nodes.

2. The salinity detection device according to claim 1, including a controller configured to determine a salinity of fluid flowing through said sensor portion based at least in part on a measured current of the first and second nodes, and to generate an output representative of said salinity.

3. The salinity detection device according to claim 2, said output comprising a plurality of visual indicators, at least one visual indicator indicative of a salinity below a first predetermined threshold and at least one visual indicator indicative of a salinity above a second predetermined threshold.

4. The salinity detection device according to claim 3, the first and second predetermined thresholds being identical.

5. The salinity detection device of claim 1, further comprising a heating member disposed on the distal side of the collection plate.

6. The salinity detection device of claim 1, wherein the interval between the first and second nodes is from about 0.1 mm to about 3.0 mm.

7. The salinity detection device of claim 1, wherein the mounting frame further includes an adjustable arm member.

8. The salinity detection device of claim 1, wherein the collection plate further includes a filtering screen disposed on the proximal side of the collection plate.

9. The salinity detection device of claim 1, wherein the outlet of said sensor portion is lower than said inlet portion when said salinity detection device is mounted to a vehicle.

10. The salinity detection device of claim 1, wherein the first and second nodes are comprised of graphite.

11. A method comprising:
    providing a vehicle equipped with the salinity detection device of claim 1, the collection plate being disposed in a wheel well of said vehicle and behind a wheel of said vehicle;
    driving said vehicle over a wet road surface, whereby water from the wet road surface impinges on the collection plate and enters said sensor portion; and
    measuring current flow through said sensor portion.

12. The method according to claim 11, further comprising determining a salinity of fluid flowing through said sensor portion.

13. The method according to claim 12, further displaying a visual indicator indicative of the salinity of said fluid.

14. The method according to claim 12, further comprising comparing the salinity to a predetermined threshold, and applying salt to said road surface if said salinity is below said predetermined threshold.

15. A vehicle comprising at least two wheels, each wheel disposed in a wheel well, and the salinity detection device of claim 1, the collection plate being disposed in at least one of the two wells of said vehicle and behind a wheel of said vehicle.

16. The salinity detection device of claim 1, wherein said channel portion is wider near the inlet than at the outlet.

\* \* \* \* \*